(12) United States Patent
Guering

(10) Patent No.: US 9,387,919 B2
(45) Date of Patent: Jul. 12, 2016

(54) AIRCRAFT NOSE STRUCTURE AND CORRESPONDING AIRCRAFT

(71) Applicant: Airbus Operations (SAS), Toulouse (FR)

(72) Inventor: Bernard Guering, Montrabe (FR)

(73) Assignee: Airbus Operations (S.A.S.), Toulouse (FR)

( * ) Notice: Subject to any disclaimer, the term of this patent is extended or adjusted under 35 U.S.C. 154(b) by 733 days.

(21) Appl. No.: 13/628,145

(22) Filed: Sep. 27, 2012

(65) Prior Publication Data
US 2013/0221156 A1 Aug. 29, 2013

(30) Foreign Application Priority Data

Sep. 30, 2011 (FR) ...................................... 11 58780

(51) Int. Cl.
*B64C 1/06* (2006.01)
*B64C 1/14* (2006.01)

(52) U.S. Cl.
CPC ............... *B64C 1/061* (2013.01); *B64C 1/1476* (2013.01)

(58) Field of Classification Search
CPC .... B64C 1/061; B64C 1/1476; B64C 1/1484; B64C 1/1492; B64C 1/14; B64C 1/062
See application file for complete search history.

(56) References Cited

U.S. PATENT DOCUMENTS

| 2,447,059 | A | * | 8/1948 | Eaton, Jr. | ............... | B64C 1/1476 244/121 |
| 2,469,436 | A | * | 5/1949 | King | ..................... | B64C 1/1476 244/121 |
| 5,085,383 | A | * | 2/1992 | Larkin | ................... | B64C 1/1476 244/121 |
| 5,377,934 | A | | 1/1995 | Hill | | |
| 6,474,600 | B1 | | 11/2002 | Apps | | |
| 7,997,529 | B2 | * | 8/2011 | Koch | ...................... | B64C 1/062 244/117 R |
| 2008/0149769 | A1 | | 6/2008 | Koch | | |

FOREIGN PATENT DOCUMENTS

| CN | 101 631 715 A | 1/2010 | | |
| CN | 101 896 398 A | 11/2010 | | |
| ES | 2112711 B1 * | 12/1998 | .............. | B64C 1/061 |
| WO | WO 2010/106271 A2 | 9/2010 | | |

OTHER PUBLICATIONS

Search Report for French Application Serial No. 1158780 (May 22, 2012).
Chinese Office Action for Application No. 2012 10544109.2 dated Sep. 2, 2015.

* cited by examiner

*Primary Examiner* — Philip J Bonzell
*Assistant Examiner* — Michael Kreiner
(74) *Attorney, Agent, or Firm* — Jenkins, Wilson, Taylor & Hunt, P.A.

(57) ABSTRACT

An aircraft nose structure comprising frames (2, 4, 6), a lower windshield frame member (12) and an upper windshield frame member (14) which are adapted to receive a windshield. The lower windshield frame member (12) has an arcuate shape with two branches which are connected together by a tie-rod (26).

10 Claims, 4 Drawing Sheets

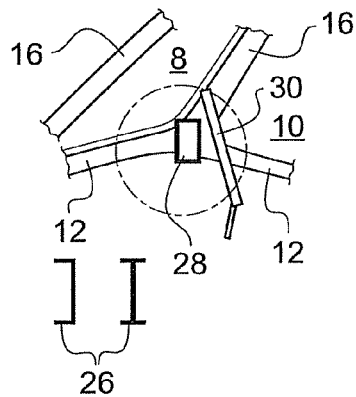
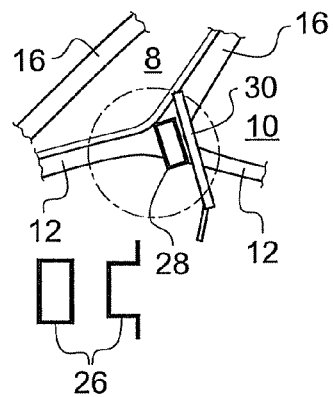
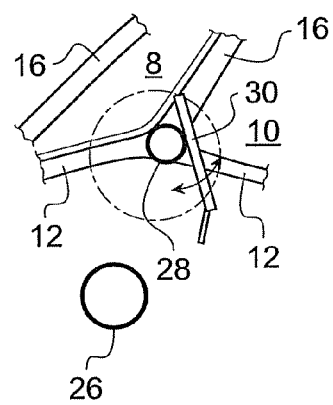
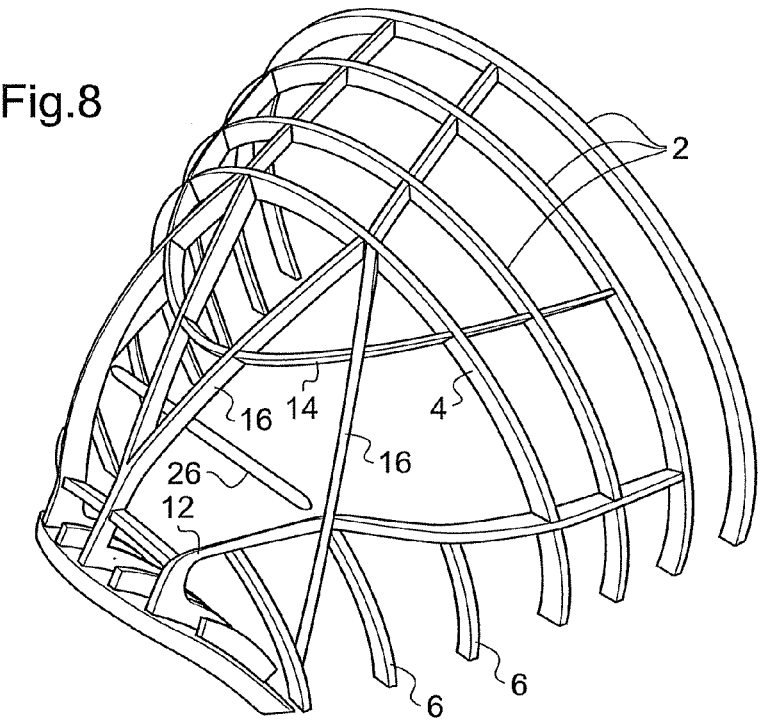

AIRCRAFT NOSE STRUCTURE AND CORRESPONDING AIRCRAFT

CROSS REFERENCE TO RELATED APPLICATIONS

This application claims the benefit of and priority to French Patent Application No. 11/58780, filed Sep. 30, 2011, the entire disclosure of which is hereby incorporated herein by reference.

TECHNICAL FIELD

The present invention concerns an aircraft nose structure and an aircraft provided with a nose having such a structure.

BACKGROUND

The nose of an aircraft, or cockpit, receives the pilots as well as the control and/or viewing systems for piloting the aircraft. This front part receives a windshield comprising a set of panes, front panes and lateral panes, in order to give the pilots good visibility to the exterior.

The various front and lateral panes are mounted between a lower windshield frame member and an upper windshield frame member which extend substantially horizontally and which are separated from each other by substantially vertical lateral uprights.

The structure of the fuselage of an aircraft generally comprises substantially circular frames extending in planes that are transverse (relative to the direction of movement of the aircraft) and which are linked by longitudinal longerons. These frames are almost all closed since they are "self-stable": the tensions in the frame are balanced and distributed. However, at the location of the nose of the aircraft, due in particular to the presence of the windshield, the frames are no longer closed but open. They are interrupted at the location of the (lower) frame member of the windshield. These open frames thus need to be reinforced to limit their deformation when they are subjected to mechanical stresses, such as the pressure difference between the inside and the outside of the aircraft in flight.

The solutions employed in an aircraft of the prior art consist of reinforcing the frames, mainly in the vicinity of the windshield frame member, that is to say at the location where they are open, and in reinforcing the lower (and also upper) windshield frame member. These reinforcements are complex, causing appreciable excess mass and encroach on the internal space of the cockpit which is intended to receive the control and/or viewing systems.

The present invention is thus directed to providing an improved aircraft nose structure. The mechanical performance of the structure must of course be at least maintained. The structure will preferably be simple, require little space and be of low mass. It will advantageously integrate into the internal layout of an aircraft cockpit.

SUMMARY

To that end, the present invention provides an aircraft nose structure comprising frames, a lower windshield frame member and an upper windshield frame member which are adapted to receive a windshield, the lower windshield frame member having an arcuate shape comprising two branches.

According to the present invention, both branches of the lower windshield frame member are connected together by a tie-rod.

The tie-rod thus acts to hold the two branches of the lower windshield frame member in the same way that a string holds a bow arcuate. Such a tie-rod is a simple structure, of low mass and also enables a space to be left free between the tie-rod and the lower windshield frame member.

According to a preferred variant, the aircraft nose structure according to the invention further comprises uprights disposed between the lower windshield frame member and the upper windshield frame member and the tie-rod links the two branches of the lower windshield frame member to the base of two uprights. In this variant, when the structure comprises two neighboring front panes and a lateral pane beside each front pane, each lateral pane being separated from the corresponding front pane by a front pane lateral upright, the tie-rod then advantageously links the two branches of the lower windshield frame member to the base of the two front pane lateral uprights. This position is favorable to facilitate the layout of an instrument panel under the windshield of the corresponding aircraft.

The tie-rod for example has at least in its central portion a closed profiled cross-section. This shape makes it possible to give bending resistance to the tie-rod which may then serve as a support for receiving for example a control screen or various systems usually present in an aircraft instrument panel. If the tie-rod has, at least in its central portion, a circular profiled cross-section, it can also serve as a pivot and systems mounted on the tie-rod may then be oriented, thereby improving the ergonomics of the aircraft instrument panel.

According to an advantageous embodiment, facilitating in particular the mounting and demounting of the tie-rod, the tie-rod has at each of its ends an adjustable ball-jointed end piece enabling length adjustment of the tie-rod assembly to be made.

The tie-rod is for example formed from a material chosen from the group of materials containing aluminum alloys and carbon-based composites.

The present invention also concerns an aircraft nose, characterized in that it comprises a structure as described above. Such an aircraft nose may comprise a dashboard, and the tie-rod may bear at least one constituent member of the dashboard.

Lastly, the present invention also concerns an aircraft comprising a fuselage with a nose, characterized in that the structure of its nose is a structure as described above.

BRIEF DESCRIPTION OF THE DRAWINGS

Details and advantages of the present invention will emerge more clearly from the following description, which is made with reference to the accompanying diagrammatic drawings in which:

FIG. 5 is a diagrammatic side view of a first embodiment of a reinforcement according to the invention, FIG. 6 corresponds to FIG. 5 for a variant embodiment, FIG. 7 corresponds to FIGS. 5 and 6 for a second variant embodiment, FIG. 8 is a perspective view of an embodiment of an upper part of a reinforced aircraft nose according to the present invention.

DETAILED DESCRIPTION

Figure 1:
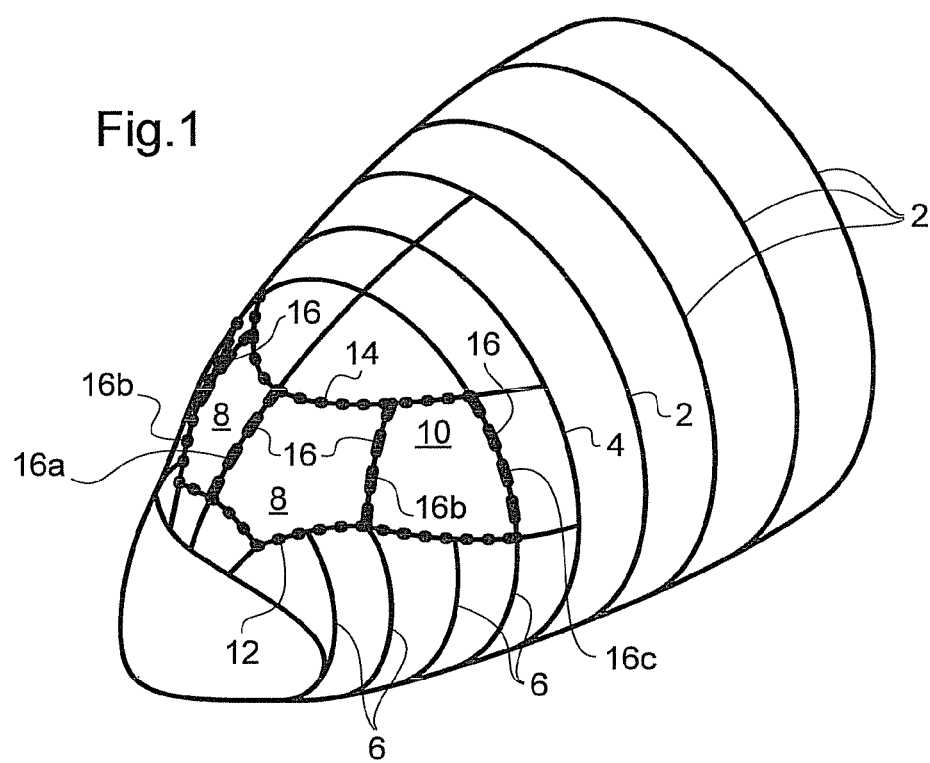
FIG. 1 is a diagrammatic perspective view showing the structure of a prior art aircraft nose.

FIG. 1 illustrates an aircraft nose structure of the prior art. First of all in this Figure, continuous frames 2 can be identified. Generally these are profiled section members that are curved so as to form a circle or more generally a closed curve. Such continuous frames 2 may be found throughout the length of an aircraft fuselage. The profile of these continuous frames 2 is dimensioned such that no structural reinforcement is necessary for them.

Forward of the continuous frames 2 there is generally a reinforced continuous frame 4 and forward of that reinforced continuous frame 4 there are open frames 8. The tip of the nose of the aircraft has a particular structure and is not described here.

The present invention more particularly concerns the structure of the aircraft in terms of the open frames 6. This region of the aircraft is particular in that it comprises a windshield which provides the pilots with good visibility to the outside of the aircraft.

In a conventional manner, a windshield is formed in several parts: front panes 8 and lateral panes 10. In the embodiment of the prior art represented in particular in FIGS. 1 and 3, an aircraft has been represented whose windshield comprises two front panes 8 and two lateral panes 10.

The different panes of the windshield are mounted between a lower windshield frame member 12 and an upper windshield frame member 14. Between the panes of the windshield there is each time an upright. There is an upright 16a between the two front panes 8, an upright 16b each time between a front pane 8 and a lateral pane 10 and an upright 16c each time linking a free end of the lower windshield frame member 12 with a free end of the upper windshield frame member 14. The upright 16a may also be called front upright, the uprights 16b may be designated as lateral uprights of the front panes and the uprights 16c as lateral uprights of the lateral panes.

Figure 2:
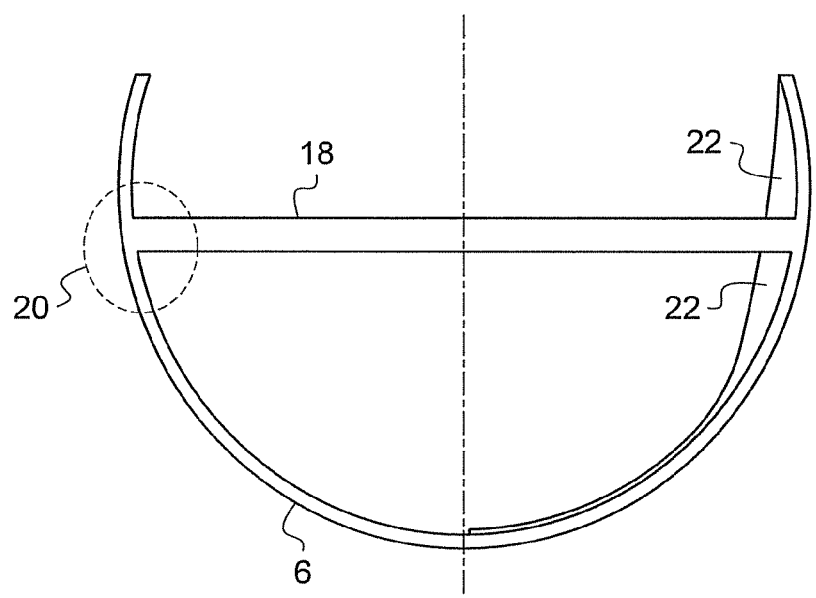
FIG. 2 is a view in elevation of an open frame which is not reinforced on the left and which is reinforced on the right.

The open frames 6 are interrupted, and thus open, at the location of the structural crossing of those frames with the lower windshield frame member 12. Such a frame is represented diagrammatically in FIG. 2 viewed from the front. This open frame 6, and the other frames of the aircraft considered, participate in supporting a floor 18. At the location of the open frame 6 considered, the floor 18 corresponds to the floor of the aircraft cockpit. The part of the open frame 6 represented on the left of FIG. 2 is not reinforced. It has a weak point surrounded by a dashed line 20. On the right portion of FIG. 2, the open frame 6 has a reinforcement 22 obtained for example by a general thickening of the frame, the thickening being greatest in the vicinity of the floor 18 to improve in particular the behavior of the fitting together achieved between the floor 18 and the open frame 6.

Reinforcements 22 such as those illustrated in the right portion of FIG. 2 are entirely necessary in an aircraft to withstand the stresses exerted on the open frame 6. For example, when an aircraft is in flight, the ambient pressure within the aircraft is substantially greater than the ambient pressure outside the aircraft. Pressure forces then act radially on each of the frames of the fuselage.

The continuous form of the continuous frames 2 enables the forces to be distributed around the whole periphery of the frame. The forces exerted slightly deform the continuous frame 2 so as to increase its diameter. The forces of pressure thus come to "dilate" the continuous frame 2.

When the frame is open, as is the case for the open frames 6, the forces of pressure do not distribute themselves. They thus tend to open the frame still further and tend to spread the free ends of the open frame 6 apart from each other. Reinforcements are thus necessary to stabilize the shape of the open frame 6. A continuous frame 2 may be considered as being self-stable.

Figure 3:
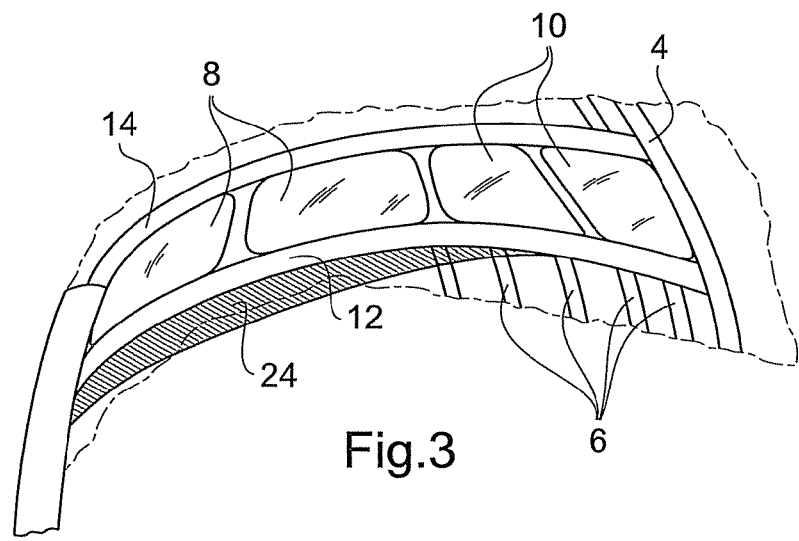
FIG. 3 is a partial view in perspective of a reinforcement of the prior art.

The lower windshield frame member 12 also requires a reinforcement since it too is formed by an open profile. The solution usually adopted to produce this reinforcement is to form a reinforcing web 24 as illustrated in FIG. 3. Such a reinforcing web 24 makes it possible to increase the second moment of area of the central part of the lower windshield frame member 12 and thereby limits the deformations of that windshield frame member under the effect of pressure. Such a solution is effective in limiting the bending of the lower windshield frame member 12 but is complex to implement and causes appreciable excess mass. Furthermore, this zone of the aircraft is adapted to receive control and viewing equipment used by the pilots in piloting the aircraft. The presence of the reinforcing web 24 is then an obstacle for the installation of the various systems required to be placed in front of the pilots of the aircraft.

Figure 4:
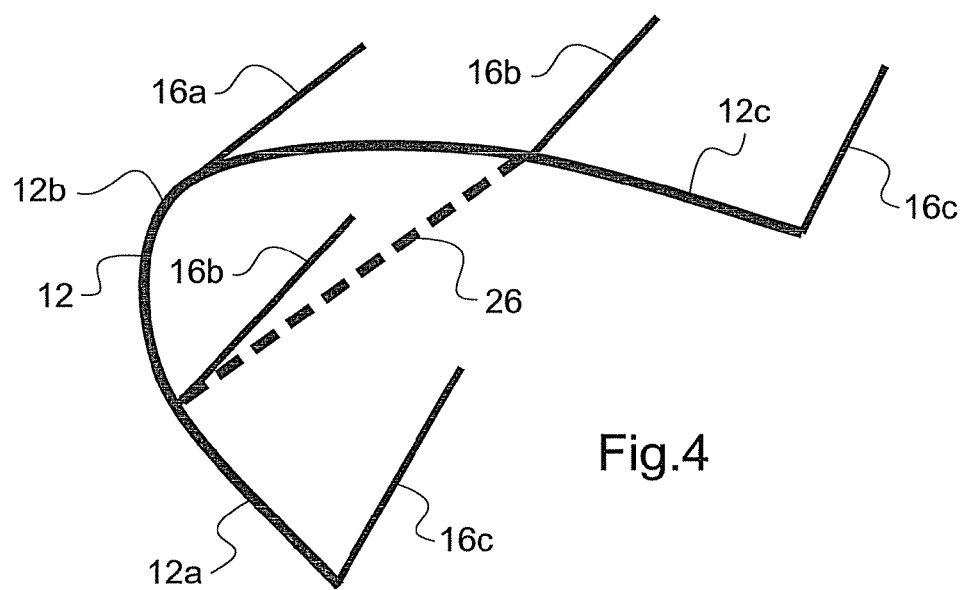
FIG. 4 is a diagrammatic illustration of a reinforcement according to the present invention.

FIG. 4 diagrammatically illustrates the solution provided by the present invention. This solution provides for establishing a direct link between two opposite points of the lower windshield frame member 12. This link is formed using a bar adapted to take up the deformations of the lower windshield frame member 12 which has an arcuate general shape, as well as the deformations of the open frames 6 in the vicinity. The linking bar, referred to subsequently as tie-rod 26, acts in the same way as the string of a bow to maintain the curved shape thereof. This tie-rod 26 acts optimally since it acts in tension.

As illustrated in FIG. 4, the arcuate lower windshield frame member 12 has two branches 12a and 12c linked together by a bowed part 12b. The branches 12a and 12c may take various forms in particular according to the form it is wished to give to the windshield. This lower windshield frame member 12 may be formed by a single part but it may also be constituted by several components. Thus, for example, the lower windshield frame member 12 may comprise the top (free end) of the open frames 6 and/or the bottom of the uprights 16a and/or 16b and/or 16c.

The tie-rod 26 preferably forms a direct link between two symmetrical points of the lower windshield frame member 12. It thus links the two branches 12a and 12c of that windshield frame member. It is also preferred for these points to be disposed at the location of the lower part of the uprights. These uprights are for example the lateral uprights 16b of the front panes, that is to say the uprights separating a front pane 8 from the neighboring lateral pane 10.

The tie-rod 26 also encroaches upon the internal space of the cockpit. However, in contrast to a reinforcing web 24 such as that illustrated in FIG. 3, it is possible to allow various components to pass between the tie-rod 26 and the lower windshield frame member 12. On account of this, the tie-rod 26 is less of a hindrance than a reinforcing web 24 with regard to the layout of the cockpit under the aircraft windshield.

The present invention utilizes that tie-rod 26 to make of it a mechanical support member also. Tie-rod 26 thus in addition integrates an additional function of structural support. This tie-rod 26 may thus for example be used to support monitoring screens and/or control systems. On account of this, the structural production of the dashboard may be simplified, which leads to additional weight saving. To be precise, the solution provided enables lightening of the structure relative to the conventional solution implementing a reinforcing web 24. Its use as a mechanical support also enables reduction in mass of the supports used in the prior art instrument panels which have a reinforcing web.

FIGS. 5 to 7 illustrate various dispositions and forms that a tie-rod 26 can take in the front part of an aircraft nose. These Figures diagrammatically represent the lower windshield frame member 12, the central upright 16a, a lateral upright 16b of a front pane (disposed between a front pane 8 and the neighboring lateral pane 10) as well as a location 28 reserved to accommodate the tie-rod 26.

In the embodiment of FIG. 5, the tie-rod 26 is used solely to stiffen the lower windshield frame member 12. A screen 30 of the aircraft instrument panel is for example mounted in the vicinity of the tie-rod 26 but without being fastened thereto. This screen 30 is for example supported by a chassis (not shown) which serves as a structure for the instrument panel and which is for example fastened to the floor of the cockpit. The profiled section member used here to form the tie-rod 26 may in conventional manner be a C or I section member.

In the variant embodiment of FIG. 6, it is possible for the tie-rod 26 to be used as a support for the screen 30 and/or for other instruments of the corresponding instrument panel. As illustrated in FIG. 6, the tie-rod 26 is oriented according to the inclination to give to the screen 30. The tie-rod 26 is also used here as a support member. It thus no longer acts solely in tension but also through bending. It is thus preferably chosen to have a profiled shape in the form of a tube of rectangular section or in the form of an Q section member. The fact that the tie-rod 26 also acts here through bending does not necessarily require an increase in the mass of the tie-rod 26. Here, the profile of the tie-rod 26 is adapted for better bending resistance.

In the variant embodiment provided in FIG. 7, the tie-rod 26 takes the form of a hollow tube of circular cross-section. The tie-rod 26 may then also service here as a support for a screen 30 and it is even possible to envision adjusting the inclination of the screen 30 by pivoting it about the tie-rod 26. The tie-rod 26 is then also used here as a hinge bearing. This additional function may be added without increasing the production cost of the structure.

In a preferred embodiment, the ends of the tie-rod 26 are provided with ball-jointed end pieces for the link with the lower windshield frame member 12.

These ball-jointed end pieces are adjustable end pieces enabling length adjustment of the tie-rod assembly 26.

Figure 9:
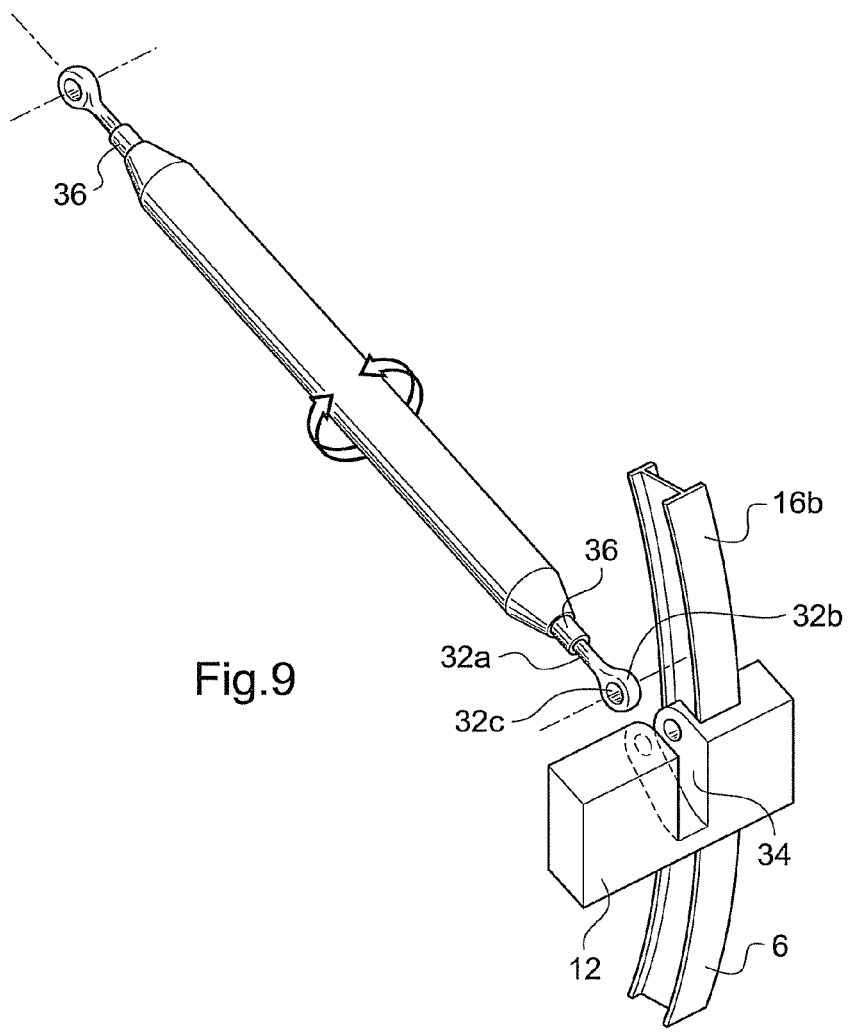
FIG. 9 is a perspective view illustrating mounting of a tie-rod to the structure of an aircraft.

FIG. 9 illustrates the mounting of the tie-rod 26 on the structure of the aircraft in more detail. In this Figure there can be seen, partially in each case, the lower windshield frame member 12, an upper end of an open frame 6 and a lateral upright 16b of a front pane 8. The tie-rod 26 has at each of its ends a longitudinal tapping. At a first end, the tapping formed is a left-handed tapping and at the other end the tapping is a right-handed tapping. Each tapping then receives a ball-jointed end piece 32. Each of its end pieces take the form of a threaded rod 32a and of a ring 32b. A bearing 32c is disposed within the ring 32b and may pivot in the manner of a ball joint, that is to say about a point, within the ring 32b. A take-up clevis 34 has the form of a stirrup comprising a base enabling it to be fastened onto the structure of the aircraft and two branches between which is provided an accommodation to receive the ring 32b of the ball-jointed end piece 32. A link shaft (not shown) is mounted through the bearing 32c of the ball-jointed end piece 32 as well as a bearing-forming bore made in each of the branches of the clevis 34.

When the assembly of tie-rod/ball-jointed end pieces is mounted, a rotation of the body of the tie-rod 26 enables extension or shortening of that assembly enabling its length to be adapted very precisely. After adjustment, the selected position is locked using counter-nuts 36—mounted in advance on the threaded rods 32a—and secured using securing wires (not shown).

The above mounting of the tie-rod 26 is given by way of non-limiting example. Other possible forms of mounting a tie-rod between two parts of a structure are available to the person skilled in the art.

The material used to produce the tie-rod may for example be an aluminum-based alloy. Such a material has a low production cost while being of low mass. However, if priority must be given to saving mass, the tie-rod 26 may be produced in a carbon-based composite material. This solution enables a mass saving to be provided but has the drawback of increasing the production cost of the structure. Other materials (metal alloys, composites materials, etc.) may of course be envisioned here.

FIG. 8 provides a new structure in the vicinity of an aircraft windshield for implementation of the present invention. First of all in this Figure can be noted the presence of a tie-rod 26 linking two points of the lower windshield frame member 12. An original form of the windshield uprights can also be noted. However, this structure is given by way of non-limiting example and the present invention may also be implemented with an aircraft nose structure of the prior art for example such as the structure illustrated diagrammatically in FIG. 1.

The present invention is particularly well-adapted for implementation with modern systems which use thin or even very thin screens. It is also possible here to envision the use of flat screens. Thus the present invention enables the screens to be brought closer to the pilots. Such a solution is preferable in a cockpit configuration not having a central control column. The structure provided by the present invention is particularly well-adapted to a control panel assembly of potentially small bulk. It also enables new equipment to be integrated since it enables the space available below the windshield of the aircraft to be optimized.

The present invention as described above enables optimization of the masses of the structure of the aircraft since the tie-rod presented is more effective mechanically than the solutions of the prior art.

The solution provided by the present invention also enables general simplification of the structure. To be precise, the tie-rod as described above is simple to assemble.

As already mentioned, the present invention enables space savings to be made as well as consequent cost savings. It is particularly well-adapted for producing modern instrument panels implementing in particular new technologies (thin screens, touch screens, etc.).

The present invention is not limited to the preferred embodiment described above by way of non-limiting example. It also concerns the variant embodiments within the capability of the person skilled in the art in the context of the claims given below.

The invention claimed is:

1. An aircraft nose structure comprising:
   frames;
   a lower windshield frame member and an upper windshield frame member which are adapted to receive a windshield, the lower windshield frame member having an arcuate shape comprising two branches;
   wherein both branches of the lower windshield frame member are connected together by a tie-rod.

2. The aircraft nose structure according to claim 1, further comprising uprights disposed between the lower windshield frame member and the upper windshield frame member, wherein the tie-rod links the two branches of the lower windshield frame member to the base of two of the uprights.

3. The aircraft nose structure according to claim 2, further comprising two neighboring front panes and a lateral pane beside each of the front panes, in that each of the lateral panes are separated from the corresponding front pane by a front pane lateral upright, and in that the tie-rod links the two branches of the lower windshield frame member to a base of the two front pane lateral uprights.

4. The aircraft nose structure according to claim 1, wherein the tie-rod has, at least in a central portion, a closed profiled cross-section.

5. The aircraft nose structure according to claim 4, wherein the tie-rod has, at least in the central portion, a circular profiled cross-section.

6. The aircraft nose structure according to claim 1, wherein each end of the tie-rod has an adjustable ball-jointed end piece enabling length adjustment of a tie-rod assembly to be made.

7. The aircraft nose structure according to claim 1, wherein the tie-rod is formed from a material chosen from the group of materials containing aluminum alloys and carbon-based composites.

8. An aircraft nose comprising a structure according to claim 1.

9. The aircraft nose according to claim 8, wherein the aircraft nose further comprises a dashboard, and in that the tie-rod bears at least one constituent member of the dashboard.

10. An aircraft comprising a fuselage with a nose, wherein a structure of the nose is a structure according to claim 1.

* * * * *